(12) United States Patent
Darshan et al.

(10) Patent No.: US 8,547,033 B2
(45) Date of Patent: Oct. 1, 2013

(54) LED STRING DRIVER WITH POWER FACTOR CORRECTOR AND CURRENT GOVERNOR

(75) Inventors: Yair Darshan, Petach Tikva (IL); Chii-Fa Chiou, Lake Forest, CA (US); David K Lacombe, Mission Viejo, CA (US)

(73) Assignee: Microsemi Corp.—Analog Mixed Signal Group Ltd., Hod Hasharon (IL)

( * ) Notice: Subject to any disclaimer, the term of this patent is extended or adjusted under 35 U.S.C. 154(b) by 133 days.

(21) Appl. No.: 13/251,308

(22) Filed: Oct. 3, 2011

(65) Prior Publication Data

US 2012/0081017 A1 Apr. 5, 2012

Related U.S. Application Data

(60) Provisional application No. 61/389,727, filed on Oct. 5, 2010.

(51) Int. Cl.
*H05B 41/16* (2006.01)

(52) U.S. Cl.
USPC ........ 315/247; 315/185 S; 315/291; 315/224; 315/312

(58) Field of Classification Search
USPC ....... 315/247, 224, 185 S, 274–289, 307–326
See application file for complete search history.

(56) References Cited

U.S. PATENT DOCUMENTS

| | | | |
|---|---|---|---|
| 2009/0295776 A1* | 12/2009 | Yu et al. | 345/212 |
| 2012/0032613 A1* | 2/2012 | Liu et al. | 315/297 |
| 2012/0229046 A1* | 9/2012 | Melanson | 315/247 |

FOREIGN PATENT DOCUMENTS

WO    2009/120555 A1    10/2009

OTHER PUBLICATIONS

Intersil ISL97801 Data Sheet; Apr. 2007; Intersil Americas Inc, Milpitas, CA.
Supertex HV9931 Data Sheet; 2008; Supertex Inc., Sunnyvale, CA.
National Semiconductor LM3445 Data Sheet; Jul. 16, 2010; National Semiconductor Corporation, Santa Clara, CA.
Maxim MAX16801A Data Sheet; Jan. 2010; Maxim Integrated Products, Sunnyvale CA.
ON Semiconductor NCL30001 Data Sheet; Mar. 2010; ON Semiconductor, Denver, CO.
NXP SLL2101 Data Sheet; Aug. 2009; NXP Semiconductors B. V., Eindhoven, Netherlands.

* cited by examiner

*Primary Examiner* — Tuyet Thi Vo
(74) *Attorney, Agent, or Firm* — Simon Kahn (57) ABSTRACT

A solid state lighting controller arranged for use with a single stage power factor correction switched mode power supply, a light emitting diode (LED) string and a current sense element arranged to sense current through the LED string, the solid state lighting controller constituted of: a current governor in series with the LED string exhibiting a governor differential amplifier and a governor electronically controlled switch responsive to the output of the governor differential amplifier, the current governor arranged to limit current flow through the LED string responsive to a current limit reference; and a feedback circuit exhibiting an error amplifier, the feedback circuit arranged to feedback a signal to the power factor correction switched mode power supply controller whose value is a function of the difference between the current through the LED string sensed by the current sense element and a target current signal.

30 Claims, 5 Drawing Sheets

LED STRING DRIVER WITH POWER FACTOR CORRECTOR AND CURRENT GOVERNOR

CROSS-REFERENCE TO RELATED APPLICATION

This application claims priority from U.S. Provisional Patent Application Ser. No. 61/389,727 filed Oct. 5, 2010, entitled "LED String Driver with Power Factor Corrector and Current Governor", the entire contents of which is incorporated herein by reference.

BACKGROUND OF THE INVENTION

The present invention relates to the field of lighting, and in particular to an LED string driver with a power factor corrector and a current governor, the current governor providing prompt current limiting.

Solid state lighting, and in particular light emitting diodes (LEDs) are rapidly coming into wide use for lighting applications. In most general lighting applications the LEDs are supplied in one or more strings of serially connected LEDs, thus sharing a common current.

LEDs providing high luminance exhibit a range of forward voltage drops, denoted $V_f$, and their luminance is primarily a function of current. Brightness control of the LEDs may be performed by either pulse width modulation (PWM) or by amplitude modulation. In a PWM brightness control a fixed current is driven through the LED string, and the duty cycle of the fixed current is adjusted in order to control the LED string brightness. In amplitude modulation the amount of current through the LED string is varied directly, thus adjusting the brightness.

The power factor of an alternating current (AC) electric power system is defined as the ratio of real power to the apparent power flowing to a load. Real power is the capacity of the circuit to perform work in a particular time, whereas apparent power is a product of the current and voltage of the circuit. Power is lost in the system when the power factor is significantly below unity. A power factor corrector (PFC) may be advantageously utilized to control the power source providing electrical energy to the LED string so as to achieve a power factor approaching unity. A power factor corrector typically comprises an error amplifier and a multiplier arranged to cooperate so as to maintain a high power factor while controlling a power converter so as to converge the input to the error amplifier towards a reference value. The bandwidth of the error amplifier loop is constrained to be less than twice the AC line frequency, typically less than 20 Hz, so that the error amplifier's output is relatively constant over a given AC line cycle.

LED strings exhibit a particular voltage to current relationship, wherein for a voltage below a minimum operating voltage no appreciable current flows, and for voltages exceeding the minimum operating voltage the current follows an exponential curve responsive to the voltage. Small changes in voltage thus result in very large changes in current, which may result in extremely large power surges before correction by the slow response time of the PFC control loop.

A two stage power source and driver provides a first stage with PFC and a second stage which advantageously exhibits a fast control loop, capable of preventing such large power surges. Unfortunately, a two stage power source and driver adds expense and may further exhibit a reduced efficiency as compared with a single stage power source and driver.

SUMMARY OF THE INVENTION

Accordingly, it is a principal object of the present invention to overcome at least some of the disadvantages of prior art power sources and LED string drivers. This is provided in certain embodiments by a single stage PFC controlled power source arranged to provide electrical power to an LED string. The LED string is provided with a current governor which acts to limit current flow through the LED string with a high bandwidth, typically in under 100 nano-seconds. Preferably the current governor exhibits a high speed governing action with a slower speed release, thus providing a stable high bandwidth current protection. The current governor further acts to provide dimming control at brightness levels which are too low for control via the PFC loop. The current governor loop is preferably provided with a reference value that is greater than the equivalent reference value of the PFC control loop.

In one embodiment a feed forward circuit is further provided arranged to increase the value of the error signal to the power factor corrector when the current governor is actively limiting current by a predetermined minimum value. Such a feed forward circuit acts to increase the response time of the PFC controller when the current governor is acting to dissipatively limit the current flow there-through.

In one embodiment, during start-up a target current value for the LED string is restricted to only change slowly over time, preferably with the rate of change less than or equal to the bandwidth of the PFC error amplifier loop.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
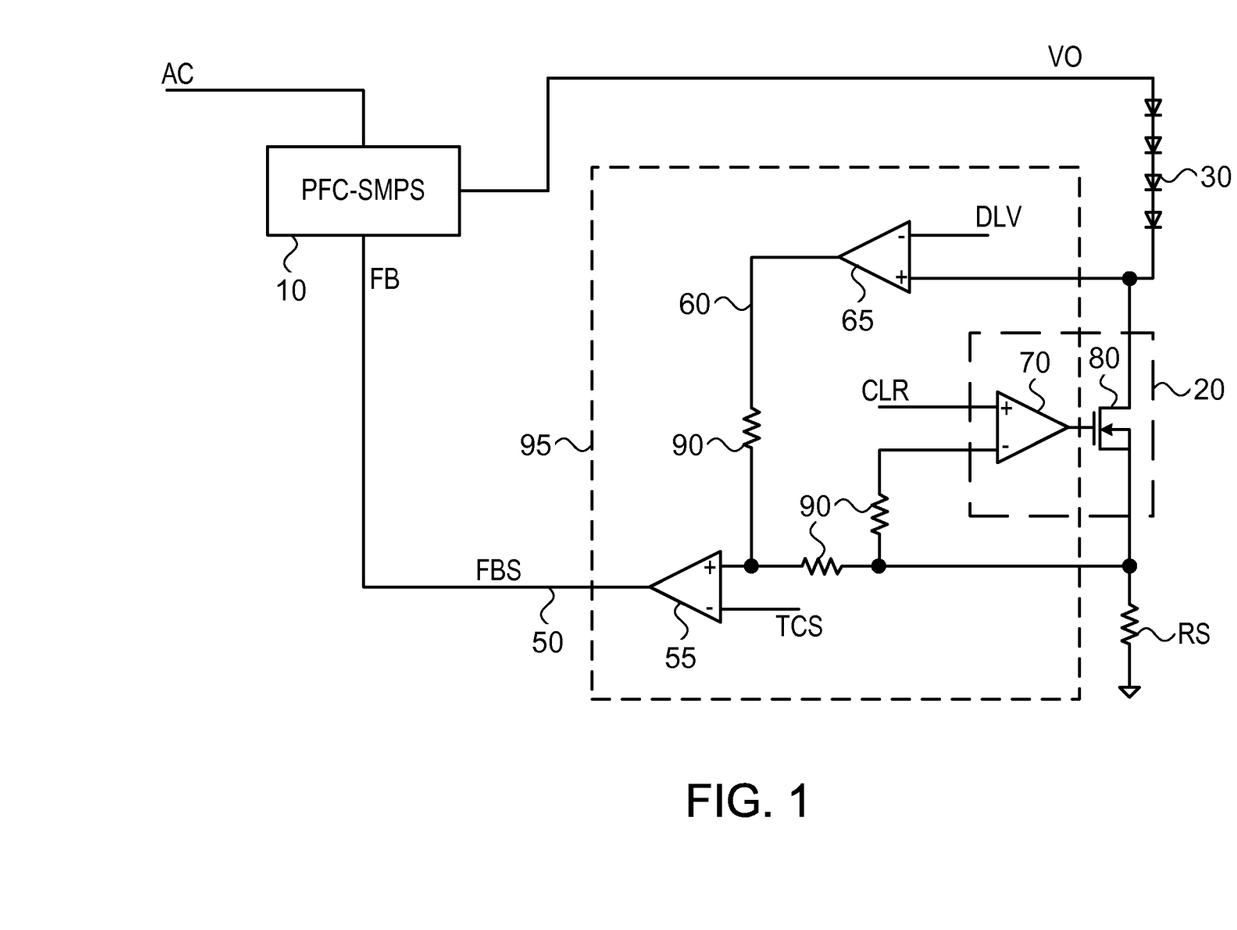
FIG. 1 illustrates a high level block diagram of an exemplary embodiment of a solid state light driving arrangement comprising a single stage PFC based converter and a current governor.

FIG. 1 illustrates a high level block diagram of an exemplary embodiment of a solid state light driving arrangement comprising: a single stage PFC switched mode power supply (SMPS) 10; a current governor 20; an LED string 30; a current sensing element illustrated without limitation as sense resistor RS; a feedback circuit 50 comprising an error amplifier 55; a feed forward circuit 60 comprising a feed forward differential amplifier 65; a plurality of resistors 90; a dissipative limit value signal denoted DLV; a current limit reference denoted CLR; and a target current signal denoted TCS. Current governor 20 comprises a governor differential amplifier 70 and a governor electronically controlled switch 80 illustrated without limitation as an NFET. In one non-limiting embodiment error amplifier 55, feed forward differential amplifier 65, governor differential amplifier 70 and resistors 90 are implemented within a solid state lighting controller 95. Single stage PFC SMPS 10 is provided with a source of electrical energy, which in an exemplary embodiment comprises an AC mains power signal, and provides a direct current output power signal VO. In an exemplary embodiment single stage PFC SMPS 10 exhibits a full wave rectifier at its input. Output power signal VO is connected to the anode end of LED string 30, and the cathode end of LED string 30 is connected in series with current governor 20 and sense resistor RS.

In further detail, the cathode end of LED string 30 is connected to the drain of governor electronically controlled switch 80 and to the non-inverting input of feed forward differential amplifier 65 of solid state lighting controller 95. The source of governor electronically controlled switch 80 is connected to a first end of sense resistor RS, to the inverting input of governor differential amplifier 70 of solid state lighting controller 95 via a first resistor 90 and to the non-inverting input of error amplifier 55 via a second resistor 90. A second end of sense resistor RS is connected to a common potential point. The non-inverting input of governor differential amplifier 70 is connected to current limit reference CLR, the inverting input of feed forward differential amplifier 65 is connected to dissipative limit value signal DLV and the inverting input of error amplifier 55 is connected to target current signal TCS. The output of feed forward differential amplifier 65 is connected to the non-inverting input of error amplifier 55 via a third resistor 90, and the output of error amplifier 55 is connected to the feedback input FB of single stage PFC SMPS 10. Each of error amplifier 55, governor differential amplifier 70 and feed forward differential amplifier 65 may be implemented with an operational amplifier without exceeding the scope.

In operation, single stage PFC SMPS 10 acts to convert the received electrical power into output power signal VO appropriate for the number of constituent LEDs within LED string 30 while further acting to align the current draw from the AC mains supplying single stage PFC SMPS 10 with the voltage of the AC mains both in terms of time and waveform. Sense resistor RS converts the current flowing through LED string 30 to a voltage representation of the current flowing through LED string 30. Error amplifier 55 of feedback circuit 50 acts to compare the voltage representation of the current flowing through LED string 30 with target current signal TCS and provide a feedback signal FBS to feedback input FB of single stage PFC SMPS 10. Single stage PFC SMPS 10 further acts to minimize the absolute value of feedback signal FBS by adjusting output power signal VO responsive thereto. Single stage PFC SMPS 10 is constrained to exhibit a bandwidth, responsive to FBS, of less than twice the AC mains frequency, typically less than 20 Hz, in order to provide a high power factor, preferably a power factor greater than 0.97.

Current governor 20 acts to promptly limit the current through LED string 30 to current limit reference CLR, with a bandwidth significantly greater than that of the bandwidth of single stage PFC SMPS 10 responsive to feedback signal FBS. Current governor 20 thus dissipatively limits the current through LED string 30 when the current through LED string 30 approaches the level represented by current limit reference CLR until single stage PFC SMPS 10 reacts to reduce output power signal VO responsive to feedback signal FBS. Current governor 20 is illustrated as a closed loop arrangement of governor differential amplifier 70 and governor electronically controlled switch 80, however this configuration is not meant to be limiting in any way. Current governor 20 is characterized by a closed loop circuit arranged to provide current limiting of the current through LED string 30 responsive to current limit reference CLR while providing minimal resistance to current flow appreciably less than current limit reference CLR. In the particular embodiment illustrated, the current through sense resistor RS is compared with current limit reference CLR by governor differential amplifier 70 and the output of governor differential amplifier 70 acts to control the resistance exhibited by governor electronically controlled switch 80.

Feed forward circuit 60 acts to compare the voltage drop across the combination of sense resistor RS and current governor 20, and in the event that the voltage drop is indicative of a large dissipative value, i.e. current governor 20 is actively limiting current flow and the voltage drop is thus greater than dissipative limit value DLV, feed forward differential amplifier 65 acts to increase the value of feedback signal FBS thus accelerating the response of single stage PFC SMPS 10 to reduce the voltage of output power signal VO.

The above has been described in relation to a single stage PFC SMPS, however this is not meant to be limiting in any way, and the use of multiple stage power supplies, and non-switched power supplies may be utilized without exceeding the scope.

Figure 2:
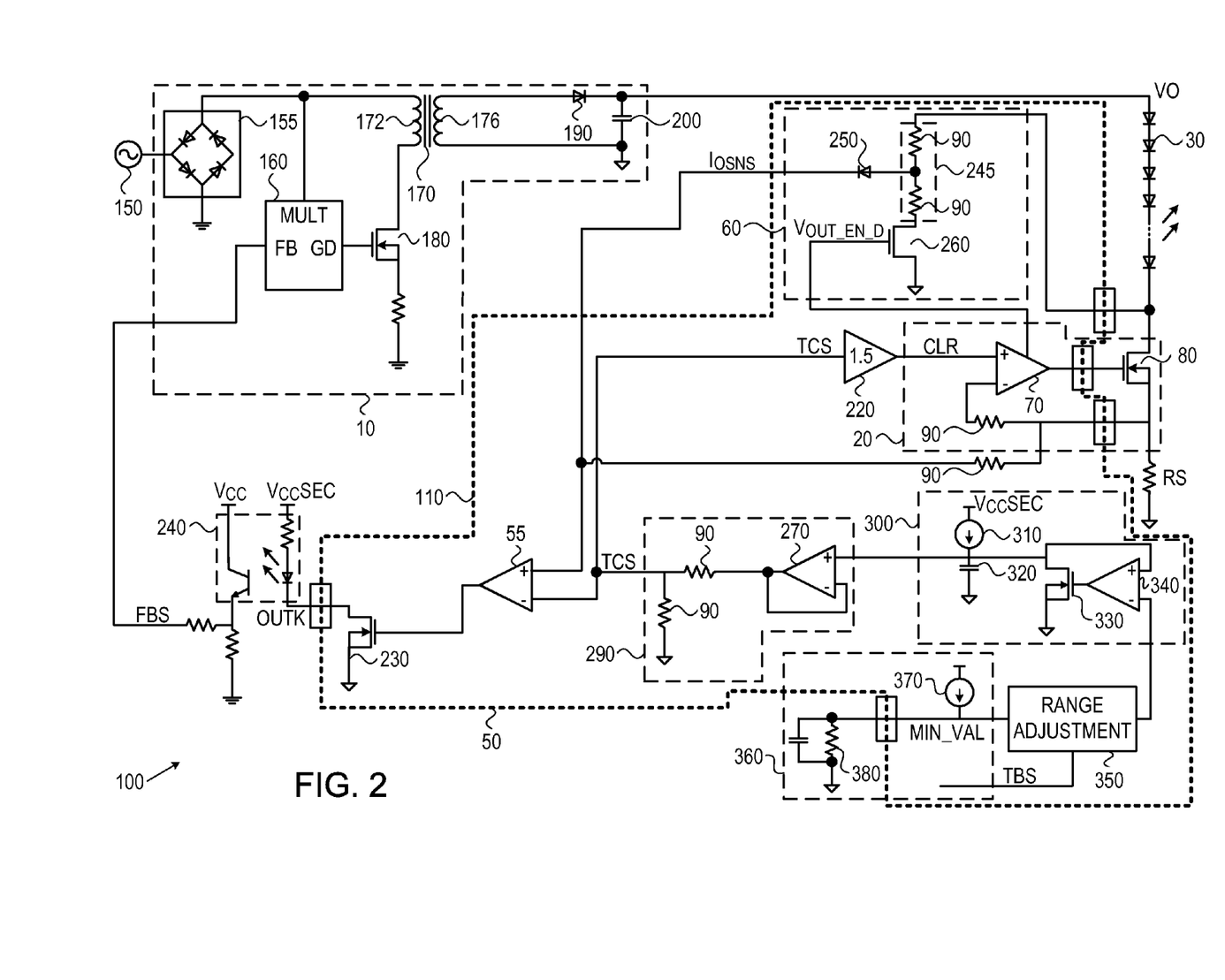
FIG. 2 illustrates a high level schematic diagram of an exemplary embodiment of the block diagram of FIG. 1.

FIG. 2 illustrates a high level schematic diagram of an exemplary embodiment of a solid state light driving arrangement 100 comprising: a single stage PFC SMPS 10; an LED string 30; a solid stage lighting controller 110; a governor electronically controlled switch 80; a sense resistor RS; a feedback circuit 50 comprising an opto-isolator arrangement 240; a range adjusting resistor 380 with an optional parallel connected capacitor; and an AC mains source 150. Single stage PFC SMPS 10 comprises a full wave rectifier 155; a PFC controller 160; a flyback transformer 170 comprising a first winding 172 and a second winding 176 magnetically coupled to first inductor 172; a converter electronically controlled switch 180 illustrated without limitation as an NFET; a unidirectional electronic valve 190 and an output capacitor 200. Solid state lighting controller 110 comprises: a plurality of resistors 90; a governor differential amplifier 70; a feed forward circuit 60 comprising a unidirectional electronic valve implemented as a diode 250 and an optional electronically controlled switch 260; an amplifier 220; an error amplifier 55; an error amplifier electronically controlled switch 230; a range converter 290 comprising a buffer 270 implemented in one non-limiting embodiment as a differential amplifier; a change rate limiter circuit 300 comprising a current source 310, a capacitor 320, an electronically controlled switch 330 and a differential amplifier 340; a range adjustment circuit 350; and a minimum value circuit 360 comprising a current source 370 in communication with range adjusting resistor 380 with parallel connected capacitor.

AC mains power source 150 is connected to full wave rectifier 155 and the positive output of full wave rectifier 155 is connected to an input MULT of PFC controller 160 and to a first end of first winding 172 of flyback transformer 170, and the return of full wave rectifier 155 is connected to a primary side common potential. A second end of first winding 172 is connected to the drain of converter electronically controlled switch 180 and the source of converter electronically controlled switch 180 is connected to the primary side common potential via a resistor. A gate driver output GD of PFC controller 160 is connected to the gate of converter electronically controlled switch 180. A first end of second winding 176 of flyback transformer 170 is connected to the anode of unidirectional electronic valve 190 and the cathode of unidirectional electronic valve 190 is connected to a first end of output capacitor 200 and to the anode end of LED string 30, and carries an output power signal VO. A second end of second winding 176 is connected to a second end of output capacitor 200 and to a secondary side common potential.

The cathode end of LED string 30 is connected to the drain of governor electronically controlled switch 80 and to a first end of two series connected resistors 90 of feed forward circuit 60, forming a resistor divider 245. A second end of the two series connected resistors 90 of feed forward circuit 60 is switchably connected to the secondary common potential via optional electronically controlled switch 260, the gate of which is controlled by a signal denoted VOUT_EN_D, which is provided by a logic circuit (not shown). The node between the two series connected resistors 90 of resistor divider 245 is connected to the anode of diode 250 and the cathode of diode 250 is connected to the non-inverting input of error amplifier 55.

The source of governor electronically controlled switch 80 is connected to a first end of sense resistor RS, via a respective resistor 90 to the inverting input of governor differential amplifier 70 and via a respective resistor 90 to the non-inverting input of error amplifier 55. A second end of sense resistor RS is connected to the secondary side common potential. An enable input of governor differential amplifier 70 is connected to signal VOUT_EN_D and the output of governor differential amplifier 70 is connected to the gate of governor electronically controlled switch 80. The enable input of governor differential amplifier 70 and the gate of electronically controlled switch 260 are illustrated as commonly connected to signal VOUT_EN_D, however this is not meant to be limiting in any way. In one embodiment a delayed signal, developed from VOUT_EN_D is provided to the enable input of governor differential amplifier 70, as will be described further below.

A target brightness signal TBS is received at a first input of range adjustment circuit 350 and the output of range adjustment circuit 350 is connected to the inverting input of differential amplifier 340 of change rate limiter circuit 300. A first end of current source 370 is connected to the secondary voltage $V_{CC}SEC$ and a second end of current source 370 is connected to a second input of range adjustment circuit 350 and to a first end of range adjusting resistor 380 with optional parallel connected capacitor. A second end of range adjusting resistor 380 with optional parallel connected capacitor is connected to the secondary side common potential.

The output of differential amplifier 340 of change rate limiter circuit 300 is connected to the gate of electronically controlled switch 330, the source of electronically controlled switch 330 is connected to the secondary side common potential and the drain of electronically controlled switch 330 is connected to the non-inverting input of differential amplifier 340 of change rate limiter circuit 300, to a first end of capacitor 320 whose second end is connected to the secondary side common potential, to the output of current source 310 whose input is connected to $V_{CC}SEC$ and to the non-inverting input of buffer 270 of range converter 290. The output of buffer 270 is connected to the inverting input of differential amplifier 270 and via two serially connected resistors 90 of range converter 290 forming a resistor divider to the secondary side common potential. The common node of the two serially connected resistors 90 of range converter 290 is connected to the inverting input of error amplifier 55 as target current signal TCS and to the input of amplifier 220 and the output of amplifier 220 representing current limit reference CLR is connected to the non-inverting input of governor differential amplifier 70.

The output of error amplifier 55 is connected to the gate of error amplifier electronically controlled switch 230, whose source is connected to the secondary side common potential, and the drain of error amplifier electronically controlled switch 230, denoted OUTK, is connected via the driving side of opto-isolator arrangement 240 to $V_{CC}SEC$. The secondary side of opto-isolator arrangement 240, exhibiting feedback signal FBS, is connected to the feedback input FB of PFC controller 160. Optionally, (not shown) a compensation network is provided between the drain of error amplifier electronically controlled switch 230, i.e. from signal OUTK, to the non-inverting input of error amplifier 55.

Amplifier 220 is illustrated without limitation as exhibiting a gain of 1.5. Governor electronically controlled switch 80 is illustrated as being external of solid stage lighting controller 110, however this is not meant to be limiting in any way, and governor electronically controlled switch 80 may be internal to solid stage lighting controller 110 without exceeding the scope. Each of current governor 20, change rate limiter circuit 300, range converter 290 and feed forward circuit 60 are illustrated as being discretely implemented, however this is not meant to be limiting in any way and current governor 20, change rate limiter circuit 300, range converter 290 or feed forward circuit 60 may be implemented digitally without exceeding the scope. Single stage PFC SMPS 10 is illustrated as a flyback converter, however this is not meant to be limiting any way, and the use of other configurations is specifically contemplated.

In operation, and as described above in relation to FIG. 1, PFC controller 160 is operative to alternatively open and close converter electronically controlled switch 180 thereby drawing current through first winding 172 when converter electronically controlled switch 180 is closed and not drawing current through first winding 172 when converter electronically controlled switch 180 is open. When converter electronically controlled switch 180 is opened, current flows through second winding 176 of transformer 170 charging output capacitor 200 and supplying power for LED string 30 with output power signal VO. PFC controller 160 is further arranged to sense the rectified sine wave via input MULT and control the alternative opening and closing of converter electronically controlled switch 180 so as to align the current draw from the AC mains 150 with the voltage of the AC mains 150 both in terms of time and waveform. PFC controller 160 further acts to adjust the timing of the operation of converter electronically controlled switch 180 so as to minimize the absolute value of feedback signal FBS appearing at input FB, however the response to changes of feedback signal FBS exhibits a low bandwidth. In further explanation, when feedback signal FBS increases PFC controller 160 acts to reduce the voltage of output power signal VO and as the value of feedback signal FBS decreases PFC controller 160 acts to increase the voltage of output power signal VO.

Both optional electronically controlled switch 260 of feed forward circuit 60 and governor differential amplifier 70 are enabled, or alternatively disabled, by control signal VOUT_EN_D, which is a signal generated by a logic, or analog, circuit to enable, or disable, power to LED string 30, in one embodiment responsive to a user off signal, and in another embodiment to a target brightness signal less than a predetermined standby value. As indicated above there is no requirement that a single signal be utilized for the control of both electronically controlled switch 260 of feed forward circuit 60 and governor differential amplifier 70, and in one embodiment the signal controlling governor differential amplifier 70 is delayed from the signal connected to electronically controlled switch 260 of feed forward circuit 60, thus providing a discharge path for output capacitor 200 for a predetermined time period after the assertion of control signal VOUT_EN_D. Current through LED string 30 is limited by current governor 20 to not exceed current limit reference CLR, except for transients. In the event that the voltage drop across current governor 20 and sense resistor RS, after being divided by resistor divider 245 exceeds the turn on voltage of diode 250, any additional voltage at the drain of governor electronically controlled switch 80 adds to the non-inverting input of error amplifier 55, and thus increases the error value when the current through sense resistor RS exceeds target current signal TCS appearing at the inventing input of error amplifier 55. Thus, in comparison to feed forward circuit 60 of FIG. 1, feed forward circuit 60 of solid state lighting arrangement 100 of FIG. 2 provides dissipative limit value DLV (not shown) responsive to resistor divider 245 and the turn on voltage of diode 250.

Target brightness signal TBS, which is preferably variable, is received at one input of range adjustment circuit 350. An adjustable minimum value, denoted signal MIN_VAL, is established by minimum value circuit 360 responsive to the value of current source 370 in cooperation with the value of range adjusting resistor 380 and optional parallel connected capacitor. Range adjustment circuit 350 is arranged to receive minimum value signal MIN_VAL and target brightness signal TBS, and provide an output ranging from minimum value signal MIN_VAL, as established by minimum value circuit 360, to a predetermined maximum value and further providing a unique output value for each value of target brightness signal TBS.

The above has been described in an embodiment where minimum value signal MIN_VAL is provided by the combination of current source 370 in combination with the value of range adjusting resistor 380 with optional parallel connected capacitor, however this is not meant to be limiting in any way, and minimum value signal MIN_VAL: may be provided by another circuit, or it may be derived from another circuit without exceeding the scope.

Change rate limiter circuit 300 receives the output of range adjustment circuit 350 and limits the rate of increase of the signal responsive to the value of current source 310 in cooperation with capacitor 320. In particular, the combination of differential amplifier 340 and electronically controlled switch 330 forms a buffer circuit, wherein the non-inverting input of buffer 270 is equal to the non-inverting input of differential amplifier 340 after allowing for charging time of capacitor 320. Target current signal TCS thus reflects target brightness signal TBS with the modifications of range adjustment circuit 350 and with limitations on the rate of increase responsive to change rate limiter circuit 300. Change rate limiter circuit 300 thus ensures that during start up, and at any sharp increase of target brightness signal TBS, target current signal TCS increases slowly so as to limit the need for dissipative action of current governor 20, since the slow start up allows for PFC controller 160 to preferably support the increased current of target current signal TCS.

Target current signal TCS is translated by amplifier 220 to current limiting reference CLR. Preferably current limiting reference CLR is greater than target current signal TCS so as to minimize the need for dissipative action of current governor 20. Advantageously, current limiting reference CLR tracks changes in target current signal TCS so as to maintain a fixed current overage headroom percentage. At low target brightness signal TBS levels, feedback circuit 50 constituted of error amplifier 55 in combination with opto-isolator arrangement 240 and the internal error amplifier of PFC controller 160 are unable to reduce the voltage of output power signal VO to levels low enough to meet the requested low target brightness signal TBS levels. In such a case, current governor 20, with a fixed percentage headroom, seamlessly takes up the task of tracking the low target brightness signal TBS levels via current limit reference CLR.

Governor differential amplifier 70 of current governor 20 of either FIG. 1 or FIG. 2 is preferred to be fast acting so as to prevent significant transient current flow in excess of current limit reference CLR. Unfortunately such a high speed response results in instability, and thus the clamping response rate of current governor 20 must be limited so as to avoid instability.

Figure 3A:
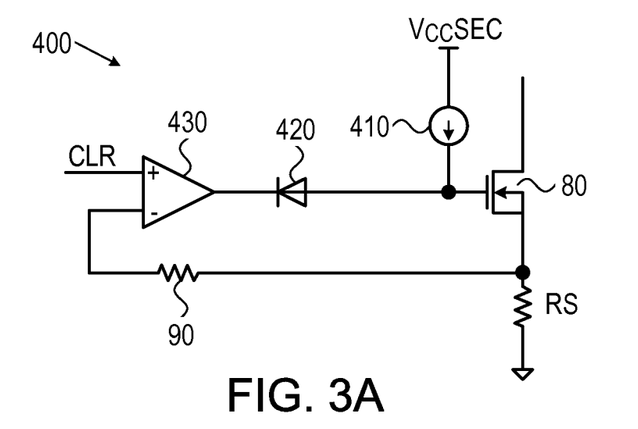
FIG. 3A illustrates an exemplary embodiment of a current governor arranged to provide a differential time response responsive to a current source.

FIG. 3A illustrates an exemplary embodiment of a current governor 400 arranged to provide a differential time response responsive to a current source 410 in cooperation with a unidirectional electronic valve 420, thus allowing for a faster response rate to over current conditions, as compared to the response rate to under current conditions, while maintaining stability. Current governor 400 may be substituted for current governor 20 of either FIG. 1 or FIG. 2, without limitation. In further detail, current governor 400 comprises: current source 410; unidirectional electronic valve 420; a governor differential amplifier 430; a governor electronically controlled switch 80 implemented without limitation as an NFET; a current sense resistor RS; and a resistor 90. The drain of governor electronically controlled switch 80 is connected to the cathode end of LED string 30 (not shown) as described above.

A first end of current source 410 is connected to an internal voltage source, denoted $V_{CC}SEC$, and a second end of current source 410 is connected to the gate of governor electronically controlled switch 80 and to the anode of unidirectional electronic valve 420. The cathode of unidirectional electronic valve 420 is connected to the output of governor differential amplifier 430, the non-inverting input of governor differential amplifier 430 is connected to a current limit reference CLR and the inverting input of governor differential amplifier 430 is connected via resistor 90 to the source of governor electronically controlled switch 80. The source of governor electronically controlled switch 80 is further connected to a first end of current sense resistor RS and a second end of current sense resistor RS is connected to a secondary side common potential. Governor differential amplifier 430 may be provided with a greater gain and/or a higher speed response than that of governor differential amplifier 70 as will be described further below. In one particular embodiment governor differential amplifier 430 may be provided with a 150 dB gain, as compared with an 80 dB gain of governor differential amplifier 70.

In operation, current flow in excess of current limit reference CLR results in rapid turn off of governor electronically controlled switch 80, as the gate capacitance of governor electronically controlled switch 80 is rapidly discharged by governor differential amplifier 430. Turn on of governor electronically controlled switch 80 is not responsive to current flow from governor differential amplifier 430, due to the blocking action of unidirectional electronic valve 420, and is instead responsive to current supplied by current source 410, which is preferably selected to provide significantly slower turn on than the turn off time provided by governor differential amplifier 430. Thus, turn off of governor electronically controlled switch 80 is responsive to the high gain of governor differential amplifier 430 while turn on is responsive to the low charging rate of current source 410 in combination with the gate capacitance of governor electronically controlled switch 80, thus providing high speed clamping with stability.

Figure 3B:
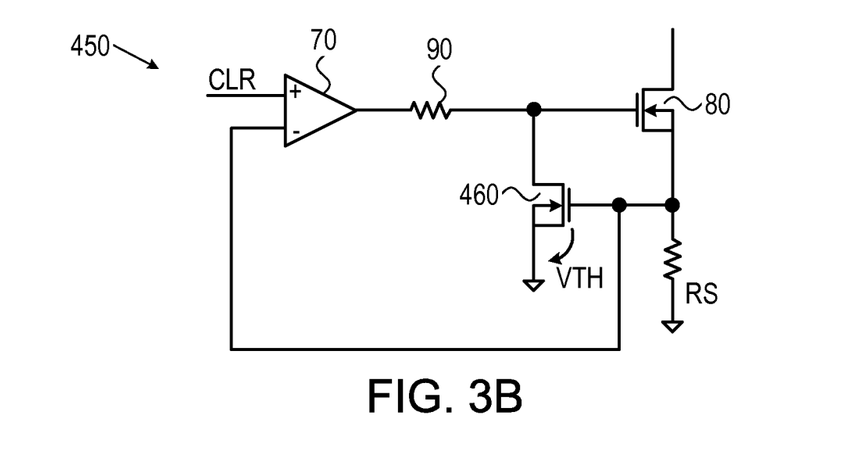
FIG. 3B illustrates an exemplary embodiment of a current governor arranged to provide a differential time response responsive to a limit threshold electronically controlled switch.

FIG. 3B illustrates an exemplary embodiment of a current governor 450 arranged to provide a differential time response responsive to a limit threshold electronically controlled switch 460 exhibiting a predetermined gate source turn on voltage set to a limit threshold voltage VTH. Current governor 450 may be substituted for current governor 20 of either FIG. 1 or FIG. 2, without limitation. In further detail, current governor 450 comprises: a governor differential amplifier 70; a governor electronically controlled switch 80 implemented without limitation as an NFET; a current sense resistor RS; a resistor 90; and a limit threshold electronically controlled switch 460 implemented without limitation as an NFET. The drain of electronically controlled switch 80 is connected to the cathode end of LED string 30 (not shown) as described above. The output of governor differential amplifier 70 is connected via resistor 90 to the gate of governor electronically controlled switch 80 and to the drain of limit threshold electronically controlled switch 460. The non-inverting input of governor differential amplifier 70 is connected to a current limit reference CLR and the inverting input of governor differential amplifier 70 is connected to the source of governor electronically controlled switch 80 and to the gate of limit threshold electronically controlled switch 460. The source of governor electronically controlled switch 80 is further connected to a first end of current sense resistor RS and a second end of current sense resistor RS is connected to the secondary side common potential. The source of limit threshold electronically controlled switch 460 is connected to the secondary side common potential.

In operation, current flow through LED string 30 is translated by current sense resistor RS to a voltage. In the event that the voltage drop across current sense resistor RS exceeds limit threshold voltage VTH, limit threshold electronically controlled switch 460 closes thus pulling the gate voltage of governor electronically controlled switch 80 towards the secondary side common potential and shutting off governor electronically controlled switch 80. The action of limit threshold electronically controlled switch 460 may be designed to be rapid, acting in under 100 ns, and thus provides rapid pinching of governor electronically controlled switch 80 when the voltage drop across current sense resistor RS exceeds VTH so as to reduce the current flow through sense resistor RS towards VTH/RS. VTH is preferably set to be above the range of potential values for current limit threshold CLR, and during normal operation current limiting to CLR is provided by the closed loop operation of governor differential amplifier 70 in cooperation with governor electronically controlled switch 80, with high speed protection against transients provided by limit threshold electronically controlled switch 460.

In one embodiment the arrangement of FIG. 3A and FIG. 3B are combined, with limit threshold voltage VTH set to rapidly pinch off governor electronically controlled switch 80 when current flow across sense resistor RS exceeds a predetermined safety limit determined by the value of limit threshold voltage VTH, with the differential time response performed responsive to the arrangement of FIG. 3A. In such a combined embodiment, preferably governor differential amplifier 70 is replaced with governor differential amplifier 430 exhibiting an increased bandwidth, and resistor 90 may be optionally dispensed with.

Figure 3C:
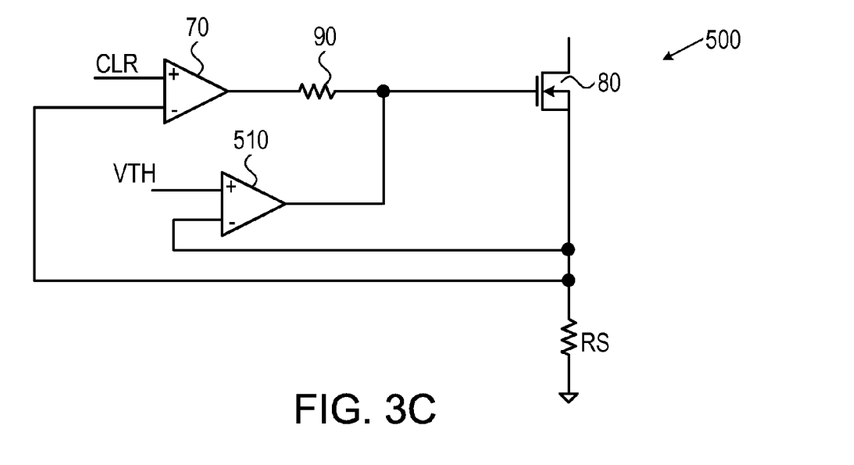
FIG. 3C illustrates an exemplary embodiment of a current governor arranged to provide a differential time response responsive to a limit threshold differential amplifier.

FIG. 3C illustrates an exemplary embodiment of a current governor 500 arranged to provide a differential time response responsive to a limit threshold differential amplifier 510 exhibiting a high gain and rapid response. Current governor 500 may be substituted for current governor 20 of either FIG. 1 or FIG. 2, without limitation. In further detail, current governor 500 comprises: a governor differential amplifier 70; a governor electronically controlled switch 80 implemented without limitation as an NFET; a current sense resistor RS; a resistor 90; and a limit threshold differential amplifier 510 exhibiting a high gain, a rapid response and an open drain output. In one non-limiting embodiment limit threshold differential amplifier 510 exhibits a gain of 150 dB. The drain of electronically controlled switch 80 is connected to the cathode end of LED string 30 (not shown) as described above. The output of governor differential amplifier 70 is connected via resistor 90 to the gate of governor electronically controlled switch 80 and to the output of limit threshold differential amplifier 510. The non-inverting input of governor differential amplifier 70 is connected to a current limit reference CLR and the inverting input of governor differential amplifier 70 is connected to the source of governor electronically controlled switch 80. The source of governor electronically controlled switch 80 is further connected to a first end of current sense resistor RS and to the inverting input of limit threshold differential amplifier 510. A second end of current sense resistor RS is connected to a secondary side common potential, and the non-inverting input of limit threshold differential amplifier 510 is connected to a limit threshold voltage VTH. Optionally (not shown) the connection to the inverting input of each of governor differential amplifier 70 and limit threshold differential amplifier 510 are protected by a resistor and voltage clamp, preventing damage in the case of extreme transient currents through sense resistor RS.

In operation, current flow through LED string 30 is translated by current sense resistor RS to a voltage. In the event that the voltage drop across current sense resistor RS exceeds limit threshold voltage VTH, the output of limit threshold differential amplifier 510 becomes negative thus pulling the gate voltage of governor electronically controlled switch 80 towards the secondary side common potential and pinching governor electronically controlled switch 80. The action of limit threshold differential amplifier 510 is preferably rapid, acting preferably in under 100 ns, further preferably on the order of 50 ns, and thus provides rapid pinching of governor electronically controlled switch 80 when the voltage drop across current sense resistor RS exceeds VTH to reduce the current flow through sense resistor RS towards the value VTH/RS. VTH is preferably set to be above the range of potential values for current limit threshold CLR, and during normal operation current limiting to CLR is provided by the closed loop operation of governor differential amplifier 70 in cooperation with governor electronically controlled switch 80, with high speed protection against transients provided by limit threshold differential amplifier 510.

In one embodiment the arrangement of FIG. 3A and FIG. 3C are combined, with limit threshold voltage VTH set to rapidly pinch off governor electronically controlled switch 80 when current flow across sense resistor RS exceeds a predetermined safety limit determined by the value of limit threshold voltage VTH, with the differential time response performed responsive to the arrangement of FIG. 3A. In such a combined embodiment, preferably governor differential amplifier 70 is replaced with governor differential amplifier 430 exhibiting an increased bandwidth, and resistor 90 may be optionally dispensed with.

Figure 4:
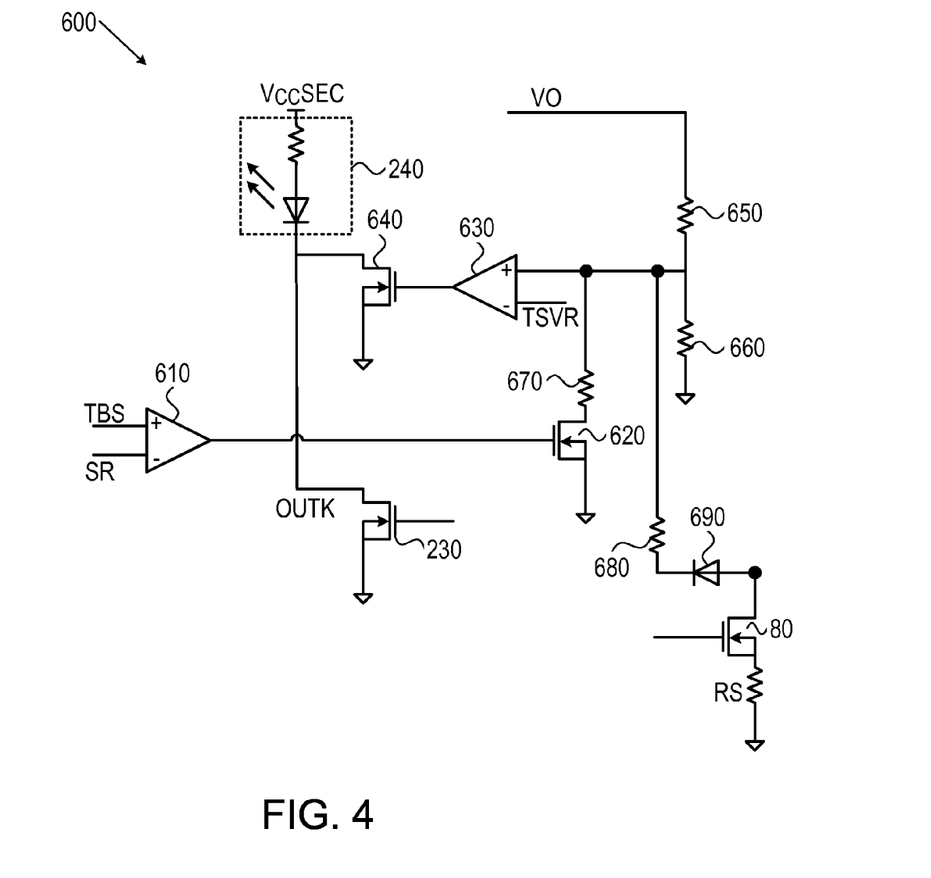
FIG. 4 illustrates a high level schematic diagram of a standby state mechanism arranged to reduce the output voltage to a predetermined level responsive to a predetermined state of a target brightness signal.

FIG. 4 illustrates a high level schematic diagram of a standby state mechanism 600 arranged to reduce the output voltage to a predetermined level responsive to a predetermined state of a target brightness signal TBS. Standby mechanism 600 comprises: a standby differential amplifier 610; a standby electronically controlled switch 620 illustrated without limitation as an NFET; a standby error amplifier 630; a standby error amplifier electronically controlled switch 640 illustrated without limitation as an NFET; resistors 650, 660, 670 and 680 and unidirectional electronic valve 690, illustrated without limitation as a diode. In addition, for clarity, error amplifier electronically controlled switch 230, opto-isolator arrangement 240, governor electronically controlled switch 80 and sense resistor RS as described above in relation to FIG. 2 are further illustrated. The non-inverting input of standby differential amplifier 610 is connected to target brightness signal TBS and the inverting input of standby differential amplifier 610 is connected to a standby reference SR. The output of standby differential amplifier 610 is connected to the gate of standby electronically controlled switch 620, the source of standby electronically controlled switch 620 is connected to the secondary side common potential and the drain of standby electronically controlled switch 620 is connected via resistor 670 to the non-inverting input of standby error amplifier 630. Output power signal VO, connected to the anode end of LED string 30 (not shown) is further connected via resistor 650 to the non-inverting input of standby error amplifier 630 and the non-inverting input of standby error amplifier 630 is further connected via resistor 660 to the secondary side common potential and via resistor 680 to the cathode of unidirectional electronic valve 690. The anode of unidirectional electronic valve 690 is connected to the drain of governor electronically controlled switch 80 and the inverting input of standby error amplifier 630 is connected to a target standby voltage reference TSVR.

The output of standby error amplifier 630 is connected to the gate of standby error amplifier electronically controlled switch 640, the source of standby error amplifier electronically controlled switch 640 is connected to the secondary side common potential and the drain of standby error amplifier electronically controlled switch 640 is connected to opto-isolator arrangement 240 in parallel with the drain of error amplifier electronically controlled switch 230, the signal denoted OUTK, as described above. Optionally, (not shown) a compensation network is provided between the drain of standby error amplifier electronically controlled switch 640, i.e. from signal OUTK, to the non-inverting input of standby error amplifier 630. Preferably target standby voltage reference TSVR is significantly greater than target current signal TCS of FIG. 2.

Resistors 650, 660 and 670 represent, in combination with standby electronically controlled switch 620, a voltage divider for output power signal VO with a plurality of states. In a first state, when standby electronically controlled switch 620 is closed, resistor 660 is in parallel with resistor 670, and in a second state, when standby electronically controlled switch 620 is open, resistor 670 is removed from the voltage divider. Thus, the voltage experienced by the non-inverting input of standby error amplifier 630 is a function of the voltage of output power signal VO, the values of the various resistors 650, 660 and 670 and the state of standby electronically controlled switch 620.

In operation, target brightness signal TBS is compared to standby reference SR by standby differential amplifier 610. In the event that target brightness signal TBS is greater than standby reference SR standby electronically controlled switch 620 remains closed and the non-inverting input to standby error amplifier 630 experiences a voltage representing the voltage of output power signal VO divided by the resistor divider network of resistors 650, 660 and 670, with resistors 660 and 670 connected in parallel, with resistors 650, 660 and 670 selected such that for all design values of output power signal VO the voltage at the non-inverting input of standby error amplifier 630 is less than target standby voltage reference TSVR, and thus standby error amplifier electronically controlled switch 640 remains off and opto-isolator arrangement 240 is solely responsive to error amplifier electronically controlled switch 230.

In the event that target brightness signal TBS is less than standby reference SR, standby electronically controlled switch 620 is opened and the non-inverting input to standby error amplifier 630 experiences a voltage representing the voltage of output power signal VO divided by the resistor divider network of resistors 650 and 660, with resistors 650 and 660 selected such that for all design values of voltage of output power signal VO the voltage at the non-inverting input of standby error amplifier 630 is greater than target standby voltage reference TSVR. The output of standby error amplifier 630 becomes positive and controls standby error amplifier electronically controlled switch 640 to draw an increased current through opto-isolator arrangement 240, thus increasing feedback signal FBS as described above in relation to FIGS. 1, 2 until the voltage of output power signal VO is reduced to a value wherein the divided voltage appearing at the non-inverting input of standby error amplifier 630 approaches target standby voltage reference TSVR. In a non-limiting embodiment target standby voltage reference TSVR is equivalent to a voltage for output power signal VO of about 7 volts.

Reducing the voltage of output power signal VO to below a conduction level of LED string 30 advantageously reduces power consumption in the standby mode and minimizes any visible light output of LED string 30 in the standby mode, which is entered when target brightness signal TBS is less than standby reference SR. As described above in relation to FIG. 2, preferably a delayed signal, developed from VOUT_EN_D is provided to the enable input of governor differential amplifier 70, the delay acting to discharge output capacitor 200 so as to ensure that the voltage of output power signal VO rapidly declines towards the value consonant with target standby voltage reference TSVR. In one embodiment (not shown) a dummy load responsive to VOUT_EN_D is further provided to increase the discharge rate of output capacitor 200. An additional advantage of reducing the voltage of output power signal VO to below the conduction level of LED string 30 during standby mode is that flickering of light output by LED string 30 during turn on is minimized, since rapid fluctuations are prevented by change rate limiter circuit 300 as described above in relation to FIG. 2.

Unidirectional electronic valve 690 utilizes standby error amplifier 630 to rapidly reduce the voltage of output power signal VO in the event that the voltage at the drain of governor electronically controlled switch 80 rises above the sum of standby voltage reference TSVR plus the forward voltage drop of unidirectional electronic valve 80.

Figure 5:
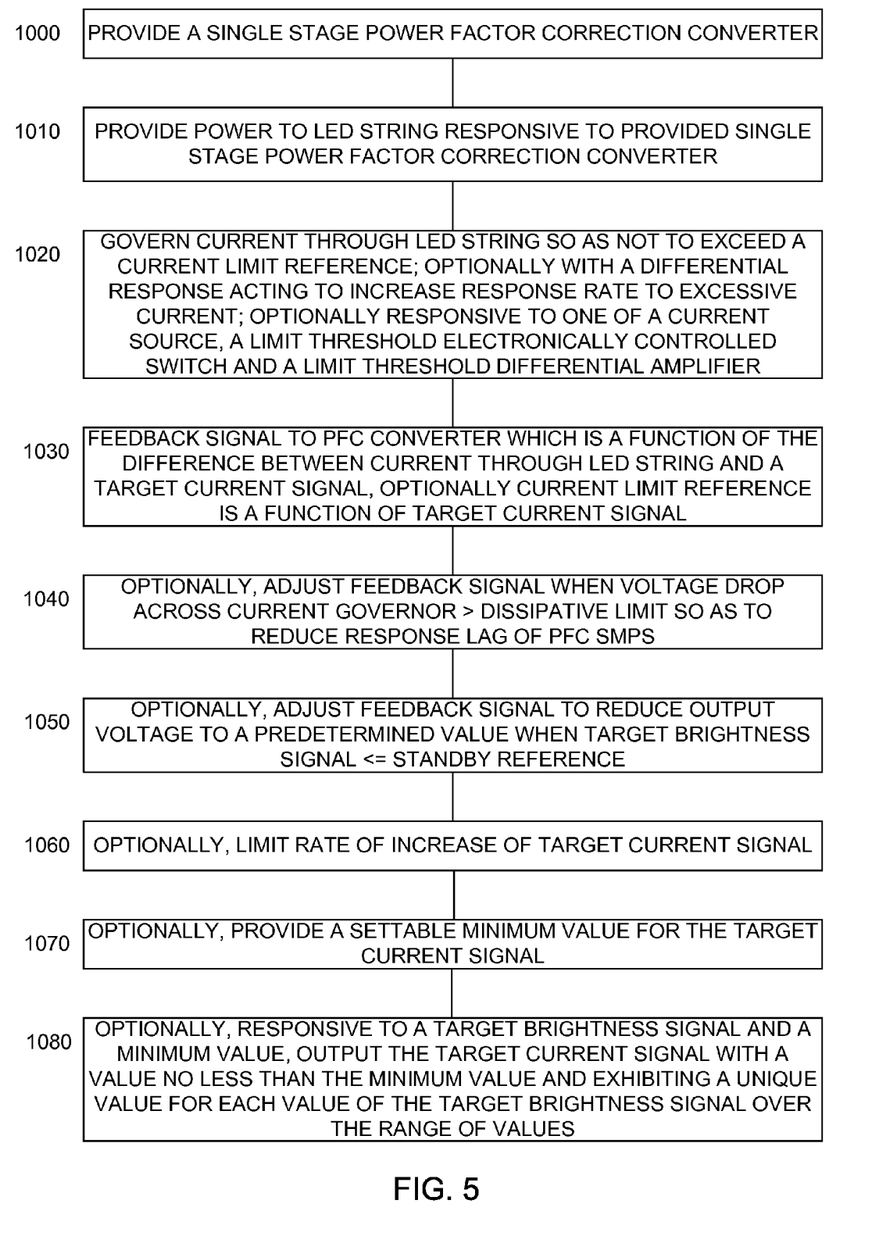
FIG. 5 illustrates a high level flow chart of an exemplary embodiment of a method of driving a light emitting diode string.

FIG. 5 illustrates a high level flow chart of an exemplary embodiment of a method of driving a light emitting diode string. In stage 1000 a single stage PFC converter as described above in relation to single stage PFC SMPS 10, is provided. In stage 1010 power is provided to a LED string responsive to the provided single stage PFC converter of stage 1000.

In stage 1020, current through the LED string of stage 1010 is governed so as not to exceed a current limit reference, as described above in relation to current limit reference CLR. Optionally, the current governing is accomplished differentially so as to increase the response rate to excess current flow as compared to the response rate to under current, as described above in relation to FIGS. 3A-3C. Optionally, the differential time response is provide responsive to one of a current source arranged to reduce the response rate to under current conditions, as described above in relation to FIG. 3A, a limit threshold electronically controlled switch arranged to increase the response rate to excess current conditions, as described above in relation to FIG. 3B and a limit threshold differential amplifier arranged to increase the response rate to excess current conditions, as described above in relation to FIG. 3C.

In stage 1030 a signal is fed back to the PFC converter of stage 1000 which is a function of the difference between the current through the LED string of stage 1010 and a target current signal, as described above in relation to feedback circuit 50, error amplifier 55 and target current signal TCS. Optionally, the current limit reference of stage 1020 is a function of the target current signal. In stage 1040, optionally the fed back signal is adjusted when the voltage drop across the current governor is greater than a dissipative limit, the fed back signal adjusted so as to reduce the response lag of the single stage PFC converter of stage 1000, as described above in relation to feed forward circuit 60 of FIGS. 1, 2, respectively.

In stage 1050, optionally the feedback signal is adjusted to reduce the output voltage to a predetermined value when a target brightness signal is less than or equal to a standby reference, as described above in relation to standby mechanism 600 of FIG. 4. Alternatively, the feedback signal is adjusted to reduce the output voltage to a predetermined value responsive to a pre-determined standby signal, or a predetermined state of the target brightness signal.

In stage 1060, optionally the rate of increase of the target current signal of stage 1020 is limited, preferably so as to be less than the bandwidth of the single stage PFC converter of stage 1000, as described above in relation to change rate limiter circuit 300.

In stage 1070, optionally a minimum value is provided for the target current signal of stage 1030, as described above in relation to signal MIN_VAL. Preferably the minimum value is settable. In stage 1080, optionally a range adjustment is performed for the target current signal of stage 1030, as described above in relation to range adjustment circuit 350. In particular, a target brightness signal is received having an allowed range of values, such as target brightness signal TBS, and a minimum value signal is received as described above in relation to stage 1070. The target current signal is output responsive to the received target brightness signal and the minimum value signal, the target current signal exhibiting a unique value for each value of the target brightness signal. Preferably, the target current signal provides a unique value between the minimum value, responsive to the minimum value signal, and a predetermined maximum value.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

We claim:

1. A solid state light driving arrangement comprising:
    a single stage power factor correction switched mode power supply arranged to output a power signal;
    a light emitting diode string arranged to receive said output power signal from said single stage power factor correction switched mode power supply;
    a current governor in series with said light emitting diode string and arranged to limit current flow through said light emitting diode string responsive to a current limit reference;
    a current sense element in series with said current governor and said light emitting diode string;
    a feedback circuit in communication with said current sense element and comprising an error amplifier, said feedback circuit arranged to output a feedback signal to said single power factor correction switched mode power supply whose value is a function of the difference between the current sensed by said current sense element and a target current, said power factor correction switched mode power supply arranged to adjust said output power signal responsive to said feedback signal; and a feed forward circuit arranged to adjust the value of the feedback signal so as to reduce the response lag of said power factor correction switched mode power supply to the feedback signal when the voltage drop across said current governor is greater than a predetermined dissipative limit value.

2. The solid stage light driving arrangement according to claim 1, wherein said single stage power factor correction switched mode power supply is arranged to adjust the voltage of said output power signal responsive to the feedback signal.

3. The solid stage light driving arrangement according to claim 1, wherein said current governor comprises a governor differential amplifier and a governor electronically controlled switch responsive to the output of said governor differential amplifier in a closed loop circuit with said current sense element.

4. The solid state light driving arrangement according to claim 1, further comprising a standby state mechanism arranged to further adjust the value of the feedback signal responsive to a predetermined state of a received target brightness signal so as to reduce the voltage of the output power signal to a predetermined standby value.

5. The solid state light driving arrangement according to claim 1, wherein said current governor is arranged to provide a differential time response rate to the current flow through said light emitting diode string, wherein the differential time response rate acts to increase the response rate to an excess condition of the current flow as compared to the response rate to an under condition of the current flow.

6. The solid stage light driving arrangement according to claim 5, wherein said current governor comprises one of:
a limit threshold electronically controlled switch arranged to increase the response rate to the excess condition of the current flow when the current flow exceeds a predetermined limit threshold;
a limit threshold differential amplifier arranged to increase the response rate to the excess condition of the current flow when the current flow exceeds the predetermined limit threshold; and
a current source arranged to reduce the response rate to the under condition of the current flow,
thereby providing the differential time response.

7. The solid state light driving arrangement according to claim 1, wherein the target current is adjustable over a range of values, and wherein the current limit reference is a function of the target current value.

8. The solid state light driving arrangement according to claim 7, further comprising a change rate limiter circuit arranged to limit the rate of increase of the target current value.

9. The solid state light driving arrangement according to claim 7, further comprising a minimum value circuit arranged to provide a settable minimum value for the target current value.

10. The solid state light driving arrangement according to claim 9, further comprising:
a target brightness signal, said target brightness signal exhibiting a predetermined range of values; and
a range adjustment circuit arranged to:
receive said target brightness signal;
receive the settable minimum value for the target current from said minimum value circuit; and
output a target current signal responsive to said received target brightness signal and the received settable minimum value for the target current, the output target signal representing the target current and exhibiting a unique value for each value of said received target brightness signal over the predetermined range of values.

11. A solid state lighting controller arranged for use with a power factor correction switched mode power supply, a light emitting diode string and a current sense element arranged to sense current flow through the light emitting diode string, the light emitting diode string arranged to receive power from the power factor correction switched mode power supply, the solid state lighting controller comprising:
a current governor in series with the light emitting diode string and arranged to limit the sensed current flow through the light emitting diode string responsive to a current limit reference; and
a feedback circuit comprising an error amplifier, said feedback circuit arranged to output a feedback signal to the power factor correction switched mode power supply whose value is responsive to the difference between the current flow through the light emitting diode string sensed by the current sense element and a target current signal; and
a feed forward circuit in communication with said current governor, said feed forward circuit arranged to adjust the value of the feedback signal so as to reduce the response lag of said power factor correction switched mode power supply to the feedback signal when the voltage drop across said current governor is greater than a predetermined dissipative limit value.

12. The solid state lighting controller according to claim 11, wherein said current governor comprises a governor differential amplifier and a governor electronically controlled switch responsive to the output of said governor differential amplifier in a closed loop circuit with said current sense element.

13. The solid state lighting controller according to claim 11, further comprising a standby state mechanism arranged to further adjust the value of the feedback signal responsive to a predetermined state of a received target brightness signal, said further adjusted value arranged so as to reduce the voltage of the power received by said light emitting diode string from the power factor correction switched mode power supply to a predetermined standby value.

14. The solid state lighting controller according to claim 11, wherein said current governor is arranged to provide a differential time response rate to the current flow through the light emitting diode string, wherein the differential time response rate acts to increase the response rate to an excess condition of the current flow as compared to the response rate to an under condition of the current flow.

15. The solid state lighting controller according to claim 14, wherein said current governor comprises one of:
a limit threshold electronically controlled switch arranged to increase the response rate to the excess condition of the current flow when the current flow exceeds a predetermined limit threshold;
a limit threshold differential amplifier arranged to increase the response rate to the excess condition of the current flow when the current flow exceeds the predetermined limit threshold; and
a current source arranged to reduce the response rate to the under condition of the current flow,
thereby providing the differential time response.

16. The solid state lighting controller according to claim 11, wherein the target current signal is adjustable over a range of values, and wherein the current limit reference is a function of the target current signal.

17. The solid state lighting controller according to claim 16, further comprising a change rate limiter circuit arranged to limit the rate of increase of said target current signal.

18. The solid state lighting controller according to claim 16, further comprising a minimum value circuit arranged to provide a settable minimum value for said target current signal.

19. The solid state lighting controller according to claim 18, further comprising:
a target brightness signal, said target brightness signal exhibiting a predetermined range of values; and
a range adjustment circuit arranged to:
receive the target brightness signal;
receive the settable minimum value for the target current signal from said minimum value circuit; and
output the target current signal responsive to the received target brightness signal and the received settable minimum value for the target current signal, the output target current signal exhibiting a unique value for each value of the received target brightness signal over the predetermined range of values.

20. A method of driving a light emitting diode string comprising:
providing a single stage power factor correction switched mode power supply;
providing power to the light emitting diode string responsive to the provided single stage power factor correction switched mode power supply;
providing a current governor arranged to govern current flow through the light emitting diode string so as not to exceed a current limit reference; and
feeding back a signal to the provided single stage power factor correction switched mode power supply, wherein the value of the fed back signal is a function of the difference between the current through the light emitting diode string of the provided power and a target current signal; and
adjusting the value of the feedback signal so as to reduce the response lag of said single stage power factor correction switched mode power supply when the voltage drop across said current governor is greater than a predetermined dissipative limit value.

21. The method according to claim 20, further comprising additionally adjusting the value of the fed back signal responsive to a predetermined state of a received target brightness signal so as to reduce the voltage of the provided power to the light emitting diode string to a predetermined standby value.

22. The method according to claim 20, wherein said governing exhibits a differential time response rate to the current flow through the light emitting diode string, wherein the differential time response rate acts to increase the response rate to the current flow exceeding the predetermined maximum as compared to the response rate to an under condition of the current flow.

23. The method according to claim 22, wherein the differential time response of said governing is responsive to one of a limit threshold electronically controlled switch and a limit threshold differential amplifier arranged to increase the response rate to the excess condition of the current flow when the current flow exceeds a predetermined limit threshold.

24. The method according to claim 22, wherein the differential time response of said governing is responsive to a current source arranged to decrease the response rate to the under condition of the current flow.

25. The method according to claim 20, wherein the target current signal is adjustable over a range of values, and wherein said current limit reference is a function of the target current signal.

26. The method according to claim 25, further comprising: limiting the rate of increase of the target current signal.

27. The method according to claim 25, further comprising: providing a settable minimum value for the target current signal.

28. The method according to claim 27, further comprising:
receiving a target brightness signal;
receiving the provided settable minimum value for the target signal; and
outputting the target current signal responsive to the received target brightness signal and the received settable minimum value, the output target current signal exhibiting a unique value for each value over the predetermined range of values of the received target brightness signal.

29. A solid state light driving arrangement comprising:
a single stage power factor correction switched mode power supply;
a light emitting diode string arranged to receive electrical power from said single stage power factor correction switched mode power supply;
a current governor in series with said light emitting diode string and arranged to limit current flow through said light emitting diode string responsive to a current limit reference;
a current sense element in series with said current governor and said light emitting diode string and arranged to sense the current flow through said light emitting diode string;
a feedback circuit in communication with said current sense element and arranged to feedback a signal to said single power factor correction switched mode power supply whose value is a function of the difference between the current flow sensed by said current sense element and a target current signal; and
a standby state mechanism arranged to adjust the value of the feedback signal responsive to a predetermined state of a received target brightness signal so as to reduce the voltage of the power received by said light emitting diode string to a predetermined standby value.

30. A solid state lighting controller arranged for use with a power factor correction switched mode power supply, a light emitting diode string and a current sense element arranged to sense current flow through the light emitting diode string, the light emitting diode string arranged to receive power from the power factor correction switched mode power supply, the solid state lighting controller comprising:
a current governor in series with the light emitting diode string and arranged to limit the current flow through the light emitting diode string responsive to a current limit reference; and
a feedback circuit comprising an error amplifier, said feedback circuit arranged to feedback a signal to a controller of the power factor correction switched mode power supply whose value is a function of the difference between the sensed current flow through the light emitting diode string and a target current signal; and
a standby state mechanism arranged to adjust the value of the feedback signal responsive to a predetermined state of a received target brightness signal so as to reduce the voltage of the power received by said light emitting diode string to a predetermined standby value.

* * * * *